United States Patent
Van Nuffel

(10) Patent No.: US 6,297,300 B1
(45) Date of Patent: Oct. 2, 2001

(54) CARBONATE POLYMER COMPOSITIONS COMPRISING LOW VOLATILE UV ABSORBERS

(75) Inventor: Claude T. E. Van Nuffel, Oostakker (BE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/575,101

(22) Filed: May 19, 2000

(51) Int. Cl.[7] ............................. C08K 5/34; C08K 5/3491
(52) U.S. Cl. ............................. 524/91; 524/100; 524/186
(58) Field of Search ............................. 524/91, 100, 186

(56) References Cited

U.S. PATENT DOCUMENTS

| | | | |
|---|---|---|---|
| 3,043,709 | * | 7/1962 | Amborski . |
| 3,215,725 | * | 11/1965 | Strobel et al. . |
| 3,309,220 | * | 3/1967 | Osteen . |
| 4,264,680 | * | 4/1981 | Anthony . |
| 4,353,965 | * | 10/1982 | Olson et al. . |
| 4,668,588 | * | 4/1987 | Kishima . |
| 4,812,498 | * | 3/1989 | Nakahara et al. . |
| 4,861,664 | * | 8/1989 | Goossens et al. . |
| 4,937,026 | * | 6/1990 | Goossens et al . |
| 5,108,835 | * | 4/1992 | Hähnsen et al. . |
| 5,288,778 | * | 2/1994 | Schmitter et al. . |
| 5,821,380 | * | 10/1998 | Holderbaum et al. . |

FOREIGN PATENT DOCUMENTS

| | | | |
|---|---|---|---|
| 68327 | * | 1/1983 | (EP) . |
| 110221 | * | 6/1984 | (EP) . |
| 247480 | * | 12/1987 | (EP) . |
| 320632 | * | 6/1989 | (EP) . |
| 338355 | | 10/1989 | (EP) . |
| 825 226 | * | 2/1998 | (EP) . |
| 2290745 | | 1/1996 | (GB) . |
| 07-9560 | | 1/1995 | (JP) . |

\* cited by examiner

*Primary Examiner*—Kriellion A. Sanders

(57) ABSTRACT

Improved carbonate polymer compositions are prepared comprising specific amounts of one or more UV absorbing compounds selected from two or more of the following groups: a hydroxybenzotriazole derivative, a hydroxyphenyltriazine derivative, or a cyanoacrylic acid ester compound wherein all UV absorbing compounds have a molecular weight of at least 400 g/mol. The carbonate polymer compositions according to the invention can be used to prepare molded, shaped or otherwise fabricated articles having improved combinations of protection against UV radiation, color and color stability with reduced plate-out behavior during processing. The compositions are especially suitable for use in extrusion, blow molding, thermoforming, and injection molding.

9 Claims, No Drawings

CARBONATE POLYMER COMPOSITIONS COMPRISING LOW VOLATILE UV ABSORBERS

FIELD OF THE INVENTION

This invention relates to a carbonate polymer composition which contains low volatile UV absorbers.

BACKGROUND OF THE INVENTION

Polycarbonate resins offer an excellent balance of properties with respect to transparency, toughness, dimensional stability and heat resistance. These properties make polycarbonate an ideal choice for the preparation of many types of molded, shaped or otherwise fabricated articles, especially including sheets or other structures and parts to be used in glazing and other outdoor applications. However, polycarbonates, like most organic polymers, degrade when they are exposed to ultraviolet (UV) light. As the polycarbonate absorbs significant amounts of high energy light and begins to degrade, it is known to become yellow and hazy and lose its toughness. Since polycarbonates derive much of their value and utility from their excellent optical properties, i.e. low color and high clarity, protection against UV becomes vital.

The use of various types of UV absorbers in the stabilization of polymers is well known. See for example U.S. Pat. No. 3,215,725 (bis cyano-diphenyl-acrylic acid esters); U.S. Pat. No. 4,812,498 (bis benzotriazoles); U.S. Pat. No. 5,288,778; GB 2,290,745 and EP 825,226 (triazine compounds); U.S. Pat. No. 5,821,380 (multifunctional 2-cyanoacrylic acid esters); EP 68,327 (cyclic imino esters also referred to benzoxazinones) and EP 110, 221 (benzophenones and benzotriazoles). These stabilizers function by absorbing incident UV radiation and dispersing the absorbed energy in a nondestructive manner. Their overall effectiveness in preventing UV degradation of the polymer depends on numerous factors, including absorptivity, compatibility, stability and distribution within the polymer. Their UV absorption effectiveness is a function of their concentration in the polymer, especially near the surface. Concentration of the UV absorber near the surface of the polymer is very desirable to prevent penetration of UV light and is considered to be more efficient and economical than dispersion of the UV absorber throughout the bulk of the polymer.

It is critical, therefore, for effective UV stabilization of polymers to have effective concentrations of UV absorbers present near the surface after processing and during long term. Both chemical and physical losses of the UV absorber will affect the concentration of UV absorbers in polymers. Chemical losses result from the thermal, photo-oxidative and oxidative reactions that inactivate or consume the compounds themselves. Physical loss of the UV absorber involves the removal of material from the surface by evaporation or dissolution that is not offset by its replacement in the surface layer by diffusion from the bulk polymer When UV absorbers are physically lost from polymers, this may lead to undesired effects, such as fuming and plate-out in sheet extrusion or juicing and mold sweat during injection molding. All of these phenomena will result in reduced UV absorber concentrations in the resin and reduced production rates due to frequent, necessary cleaning operations of the equipment. Improved retention of an UV absorber conversely provides more effective stabilization in the desired end use as well as better processability in terms of reduced fuming, plate-out, mold sweat, juicing, etc.

Various methods have been used to improve the UV-stability of polycarbonate (PC). Common approaches are to use UV absorbers as additives in the polycarbonate and to apply layers or other surface treatments to prepare structures where the UV absorbers can be concentrated in the surface or outer layers to prevent UV radiation from deeper penetration into and degradation of the main thickness of the PC sheet. A number of methods and techniques have been developed to concentrate UV absorbers near or at the surface of polymeric materials. These include surface impregnation (see for example U.S. Pat. Nos. 3,309,220; 3,043,709; 4,861,664 and 4,937,026); coating a plastic article with solutions containing thermoplastic resins and UV absorbers (see for example U.S. Pat. Nos. 4,668,588 and 4,353,965); thermal bonding of film layers (see for example JP 07-9,560); and coextrusion (see for example EP 110,221; 247,480; 320,632; 338,355 and 825,226; GB 2,290,745 and U.S. Pat. Nos. 4,264,680 and 5,108,835). In these and other coextrusion references, there is an emphasis on the use of higher molecular weight and lower volatility compounds if used in higher concentrations in coextruded surface layers.

However, in the case of polycarbonate formulations and especially coextrudable compositions, which contain high levels of UV absorbers, it is always desirable to have improved combinations of physical, processing and appearance properties. It is especially desirable to have such improved resins, improved stabilized articles and improved processes where the stabilizers volatilize less and are better maintained in the compositions and articles during and after processing.

SUMMARY OF THE INVENTION

It is thus the objective of the present invention to provide improved carbonate polymer compositions and improved molded, shaped or otherwise fabricated articles having appropriate UV protection (e.g., appearance stability) especially for outdoor applications. It is also an objective to provide an improved process for the preparation of these improved molded, shaped or otherwise fabricated articles.

In one embodiment, this invention relates to improved carbonate polymer compositions comprising one or more UV absorbing compounds selected from two or more of the following groups: a hydroxybenzotriazole derivative, a hydroxyphenyltriazine derivative, or a cyanoacrylic acid ester compound, wherein all UV absorbing compounds have a molecular weight of at least 400 g/mol.

In another embodiment, the present invention is an improved process for preparing a carbonate polymer composition as described hereinabove.

In a further embodiment, the present invention involves a process of extruding or molding (e.g., thermoforming, blow molding, injection molding, etc.) an improved carbonate polymer composition prepared as described hereinabove and extruded or molded into an improved extruded or molded article.

In yet a further embodiment, the invention involves extruded or molded articles of an improved carbonate polymer composition as described hereinabove.

It has been found that the improved carbonate polymer compositions and the improved articles which can be prepared have excellent resistance against UV radiation and provide improved combinations of base color and color stability. It has also been found that the UV absorbers added according to the present invention provide reduced levels of color or yellowing in the final carbonate polymer compositions/articles. This can be particularly noticeable in the resin granules when high levels of UV absorbers are incorporated in a resin to be used as the coextrudable surface layer or when there are multiple thickness of extruded sheet or other article that is stacked or lined up together.

It has also been found that the invention provides improved processes for preparing such articles with reduced levels of plate-out, fuming, mold sweat and/or juicing.

DETAILED DESCRIPTION OF THE INVENTION

All types of carbonate polymers are generally suitable for use in the compositions, articles and processes of the present invention. Many types of suitable carbonate polymers are well known and commercially available. Suitable types of carbonate polymers include linear and branched carbonate polymers as well as blends thereof. As mentioned above, the present invention is directed both to formulations based on carbonate polymers which can be directly used to prepare molded, shaped or otherwise fabricated articles ("bulk stabilized resins") and to formulations based on carbonate polymers which can be used as a surface or external coating or layer ("capstock resins") to protect substrate articles or core layers which can be a carbonate polymer of the same or different type or some other polymer resin.

The carbonate polymers of the present invention can be prepared using any of the known polycarbonate polymerization processes, including the interfacial process, solution process or the melt or solid state advancement versions of the transesterification carbonate polymer polymerization process.

In general, these carbonate polymers are prepared from one or more multihydric components by reacting the multihydric compound, such as a diphenol, with a carbonate precursor such as phosgene, a haloformate or a carbonate ester such as diphenyl or dimethyl carbonate. Aromatic carbonate polymers are preferred and aromatic diphenols are preferred for use as at least part of the multihydric compound with preferred diphenols including but not limited to 2,2-bis(4-hydroxyphenyl)propane (bisphenol A), phenol, 4,4'-(9-H-fluorene-9-ylidene)bis (bishydroxyphenylfluorene), 4,4'-thiodiphenol (TDP), 1,1-bis(4-hydroxyphenyl)-1-phenyl ethane (bisphenol AP); phenolphthalein; bis(4-hydroxyphenyl)diphenyl methane; tetrabromobisphenol A (TBBA); and tetrachlorobisphenol A (TCBA). These carbonate polymers also include aromatic carbonate polymers prepared from two or more different dihydric phenols or a combination of a dihydric phenol and a glycol or a hydroxy- or acid-terminated polyester or a dicarboxylic acid in the event a carbonate copolymer or heteropolymer is desired.

The linear and branched carbonate polymers suitable for use in the present invention also include carbonate polymers prepared from two or more different multihydroxy compounds, preferably dihydroxy compounds, and preferably phenols, or a combination of a multihydroxy compound, such as a diphenol, and a glycol or a hydroxy- or acid-terminated polyester or a dicarboxylic acid in the event a carbonate copolymer or heteropolymer is desired. It is also possible to employ multifunctional carboxylic acids, especially aromatic carboxylic acids, and prepare poly (estercarbonate) resins such as the known aromatic poly (estercarbonates). The known silicon-containing carbonate monomers can also be used to prepare silicon-containing carbonate polymers that are suitable for use in the present invention.

Suitable types and amounts of chain terminators (typically monophenolic compounds) and, in the case of branched polycarbonates, branching agents (typically phenols having three or more hydroxy groups) can be employed to obtain the desired molecular weight and branching degrees in the higher molecular weight branched component.

Suitable branching agents are generally one or more of the following: phloroglucin; phloroglucid; 2,6-dimethyl-2,4,6-tri(4-hydroxyphenyl)heptene-3; 4,6-dimethyl-2,4,6-tri(4-hydroxyphenyl)heptene-2; 4,6-dimethyl-2,4,6-tri(4-hydroxyphenyl)pentene-2; 4,6-dimethyl-2,4,6-tri(4-hydroxyphenyl)pentane; 1,3,5-tri(4-hydroxyphenyl) benzene; 1,3,5-tri(2-hydroxyphenyl)benzol; 1,1,1-tri(4-hydroxyphenyl)ethane; 2,6-bis(2-hydroxy-5-methylbenzyl)-4-methylphenol; tetra(4-hydroxy-phenyl)methane; trisphenol; bis(2,4-dihydroxyphenyl)ketone; 1,4-bis(4,4-dihydroxytriphenylmethyl)benzene; α,α', α"-tri(4-hydroxyphenyl)-1,3,5-tri-isopropylbenzene; 3,3-bis(4-hydroxyaryl)oxyindole; isatinbisphenol; 5-chloroisatin; 5,7-dichloroisatin; 5-bromoisatin; trimellitic acid; pyromellitic acid; benzophenonetetracarboxylic acid; and including for the appropriate compounds, the acid chlorides or other condensation reactive derivatives thereof. Specifically preferred branching agents include phloroglucin; phloroglucid; 1,1,1-tri(4-hydroxyphenyl)ethane; trimellitic acid; pyromellitic acid; benzophenonetetracarboxylic acid and acid chlorides thereof; 2,6-bis(2-hydroxy-5-methylbenzyl)-4-methylphenol and 1,3,5-tri(4-hydroxyphenyl)benzene.

It has been found that levels of branching agent in the branched carbonate polymer components for use in the present invention should be in the range of from about 0.005 to about 1.0 mole branching agent per mole of dihydroxy compound, preferably from about 0.01 to about 0.8, and more preferably from about 0.1 to about 0.6 mole branching agent per mole of dihydroxy compound.

In general, by whatever production technique it is prepared and whichever type or types it is, the carbonate polymer should have a molecular weight that provides the desired balance of processing features (melt flow rate, melt strength, shear sensitivity and the like) and physical properties (toughness, surface properties and the like) according to the known trade-offs between these. In general, the polycarbonate resin should have a weight average molecular weight of at least about 18,000, preferably at least about 20,000 and more preferably at least about 21,000 and not greater than about 42,000, preferably not greater than about 41,000 and more preferably not greater than about 40,000.

In general, branched carbonate polymers are commercially available and should have a weight average molecular weight of at least about 22,000, preferably at least about 25,000 and more preferably at least about 27,000. In order to obtain branched polymer with minimized levels of gels and other beneficial effects of the branched component, it has been found that the weight average molecular weight of a branched polymer should not be higher than about 39,000, preferably not higher than about 38,000, most preferably not higher than about 37,000. In this range it has been found that the branched carbonate polymer should have a melt flow rate (MFR) determined under conditions of 300° C. and 1.2 kilograms mass (300° C./1.2 kg) of at least about 2 grams per 10 minutes (g/10 min.), preferably at least about 2.5 g/10 min. and most preferably at least about 3.0 g/10 min. It has been found that the branched carbonate polymer should have a melt flow rate preferably no more than about 30 g/10 min., preferably no more than about 15 g/10 min. and most preferably no more than about 12 g/0 min.

In general, it can be indirectly determined whether there is a sufficient degree of branching in the branched carbonate polymer by measuring the change in shear sensitivity due to the incorporation of the branched carbonate polymer in a carbonate polymer blend composition. These measurements of shear sensitivity can be done by standard techniques with dynamic mechanical spectroscopy (DMS) or by capillary rheometry.

Suitable linear carbonate polymers are known in the literature and commercially available. For purposes of obtaining desired toughness and crack resistance, it has been found that the linear carbonate polymer component should have a weight average molecular weight of at least about 18,000, preferably at least about 20,000, and most preferably at least about 21,000. In order to keep the desired level of polymer melt flow and processability it has been found that the linear carbonate polymer component should have a weight average molecular weight of no more than about 42,000, preferably no more than about 41,000, most preferably no more than about 40,000. In this range it has been found that the linear carbonate polymer should have a melt flow rate of at least about 2 g/10 min., preferably at least about 2.5 g/10 min. and most preferably at least about 3.0 g/10 min. It has been found that the linear carbonate polymer should have a melt flow rate of no more than about 80 g/10 min., preferably no more than about 40 g/10 min. and most preferably no more than about 35 g/10 min.

For the present invention, blend compositions consisting of a branched carbonate polymer and a linear carbonate polymer component can be used. It is understood that the carbonate polymers suitable for use according to the present invention may be a single component carbonate polymer directly obtained from a polymerization process. On the other hand, the carbonate polymer can also be based on a combination of two components of the same type of differing molecular weights and melt flow rates that are blended to obtain the desired intermediate melt flow rate product.

Listed hereinbelow are examples of some preferred carbonate polymers. CALIBRE™ brand polycarbonate resins are commercially available from The Dow Chemical Company. The molecular weights of the components are determined by gel permeation chromatography (GPC). The melt flow rate values are measured according to ASTM D-1238 (300° C./1.2 kg) and are reported in g/10 min. Unless otherwise indicated, the references to "molecular weight" herein refer to weight average molecular weights ($M_w$) determined on the carbonate polymers using gel permeation chromatography with a bisphenol A polycarbonate standard. It should be noted that various references refer to "viscosity average" molecular weight ($M_v$), which is not the same as "weight average" molecular weight but can be correlated or converted to $M_w$ values. Molecular weight distribution (MWD) is the ratio of weight average molecular weight to number average molecular weight ($M_w/M_n$).

Preferred Carbonate Polymers

| Carbonate Polymer | MFR | $M_w$ | $M_n$ | MWD | Type |
|---|---|---|---|---|---|
| CALIBRE 600-3 | 3 | 36500 | 13700 | 2.66 | Branched |
| CALIBRE 200-3 | 3 | 38700 | 14200 | 2.72 | Linear |
| CALIBRE 200-15 | 15 | 26400 | 10500 | 2.52 | Linear |

The carbonate polymer compositions, articles and processes according to the present invention are based on the use of two or more UV absorbers selected from two or more of the following groups: (i) a hydroxybenzotriazole derivative, (ii) a hydroxyphenyltriazine derivative, or (iii) a cyanoacrylic acid ester compound, wherein all UV absorbing compounds of the present invention have a molecular weight equal to or greater than about 400 g/mol.

The hydroxybenzotriazole derivatives suitable for use in the present invention are represented by the formula 1:

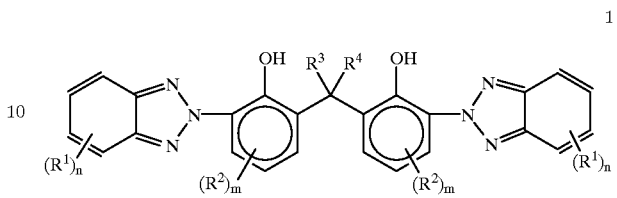

1 wherein $R^1$ and $R^2$, which may be the same or different, represent H, halogen, $C_1$–$C_{10}$ alkyl, $C_5$–$C_{10}$ cycloalkyl, $C_7$–$C_{13}$ aralkyl, $C_6$–$C_{14}$ aryl, $OR^5$ or $COOR^5$, wherein $R^5$ represents H or $C_1$–$C_4$ alkyl; $R^3$ and $R^4$ may also be the same or different and represent H, $C_1$–$C_4$ alkyl, $C_5$ or $C_6$ cycloalkyl, benzyl or $C_6$–$C_{14}$ aryl; m represents 1, 2 or 3 and n represents 1, 2, 3, or 4.

$R^1$ preferably represents H, Cl or $CH_3$ and $R^2$ preferably represents H, $C_1$–$C_{10}$ alkyl, cyclohexyl, $C_7$–$C_9$ aralkyl, phenyl or naphthyl. $R^3$ and $R^4$ preferably represent H or $C_1$–$C_4$ alkyl; m preferably represents 1, and n also preferably represents 1.

Particularly preferred hydroxybenzotriazole derivatives (1) are those wherein $R^1$ represents H; $R^2$ represents H or $C_1$–$C_9$ alkyl; $R^3$ represents H; $R^4$ represents H; m represents 1 and n represents 1.

A most preferred example of a hydroxybenzotriazole derivative of this invention is 2,2'-methylene-bis-(6-{2H-benzotriazol-2-yl}-4-{1,1,3,3-tetramethylbutyl}-phenol) represented by the following structure:

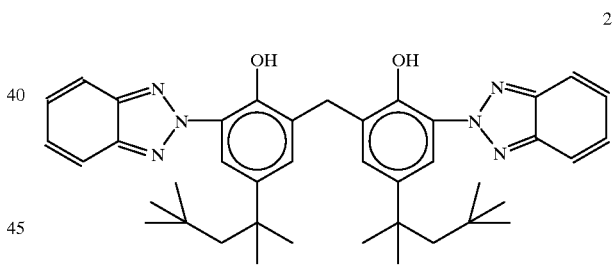

2

These higher molecular weight hydroxybenzotriazole derivatives are selected to provide optimized benefits and properties in the areas of UV stabilization performance, improved processability (due to reduced volatility, reduced plate-out, reduced fuming, and the like) and performance and appearance of the final articles. In general, these compounds should have molecular weights equal to or greater than about 400, preferably equal to or greater than about 500, more preferably equal to or greater than about 550 and most preferably equal to or greater than about 600 g/mol. In general, at higher molecular weights there is diminishing solubility in polycarbonate and increasing costs and molecular weights of these compounds should not be greater than about 2500, preferably not greater than about 2000, more preferably not greater than about 1800, and most preferably not greater than about 1600 g/mol.

The hydroxyphenyltriazine derivatives suitable for use in the present invention are taught in U.S. Pat. No. 5,288,778 and EP 825 226 which are incorporated by reference. These compounds are generally represented by the following formula:

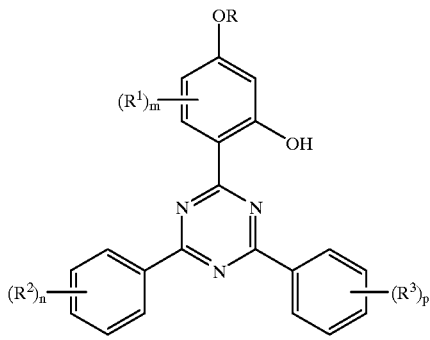

wherein R is hydrogen, $C_1$ to $C_{18}$ alkyl, $C_2$ to $C_6$ alkyl substituted by halogen or by $C_1$ to $C_{12}$ alkoxy, or is benzyl and $R^1$, $R^2$, and $R^3$ which may be the same or different, represent H, halogen, $C_1$–$C_{10}$ alkyl, $C_5$–$C_{10}$ cycloalkyl, $C_7$–$C_{13}$ aralkyl, $C_6$–$C_{14}$ aryl, $OR^4$ or $COOR^4$, wherein $R^4$ represents H or $C_1$–$C_4$ alkyl; and m represents 1, 2 or 3 and n and p which may be the same or different, represent 1, 2, 3, 4 or 5.

$R^1$ preferably represents hydrogen and $R^2$ and $R^3$ which may be the same or different, preferably represent H, $C_1$–$C_{10}$ alkyl, cyclohexyl, $C_7$–$C_9$ aralkyl, phenyl or naphthyl and most preferably H or $C_1$–$C_{10}$ alkyl; m preferably represents 1, and n and p which may be the same or different, preferably represent 1 or 2.

A most preferred example of a hydroxyphenyltriazine derivative of this invention is 2-(4,6-diphenyl-1,3,5-triazin-2-yl)-5-hexyloxyphenol represented by the following structure:

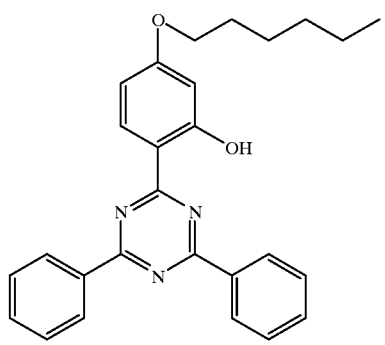

These higher molecular weight hydroxyphenyltriazine derivatives are selected to provide optimized benefits and properties in the areas of UV stabilization performance, improved processability (due to reduced volatility, reduced plate-out, reduced fuming, and the like) and performance and appearance of the final articles. In general, these compounds should have molecular weights equal to or greater than about 400 and most preferably equal to or greater than about 425 g/mol. In general, at higher molecular weights there is diminishing solubility in polycarbonate and increasing costs and molecular weights of these compounds should not be greater than about 2500, preferably not greater than about 2000, more preferably not greater than about 1800, and most preferably not greater than about 1600 g/mol.

The cyanoacrylic acid ester compounds and processes for their preparation suitable for use in the present invention are taught in U.S. Pat. No. 5,821,380 which is incorporated by reference. These compounds are generally represented by the following formula:

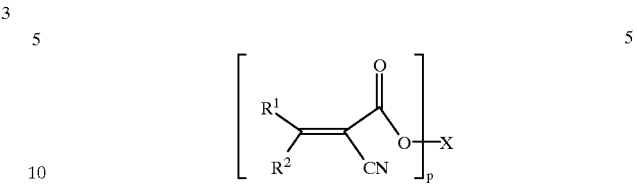

where the $R^1$ and $R^2$ substituents are each hydrogen or a radical having an iso- or heterocyclic ring system with at least one iso- or heteroaromatic nucleus, and at least one of the radicals $R^1$ or $R^2$ must be different from hydrogen; p has an average value of from about 2 to about 10, preferably at least 3 and more preferably has a value of 4; X is the radical of an aliphatic or cycloaliphatic polyol having from about 3 to about 20 carbon atoms and at least p hydroxyl groups, a cycloaliphatic radical optionally containing 1 or 2 hetero atoms, and an aliphatic radical optionally being interrupted by up to 8 non-adjacent oxygen atoms, sulfur atoms, imino or $C_1$–$C_4$-alkylimino groups.

A most preferred example of the UV absorbers of this invention is: 1,3-bis-[(2'-cyano-3',3'-diphenylacryloyl)oxy]-2,2-bis-[(2-cyano-3',3'-diphenylacryloyl)oxy]methyl) propane represented by the following structure:

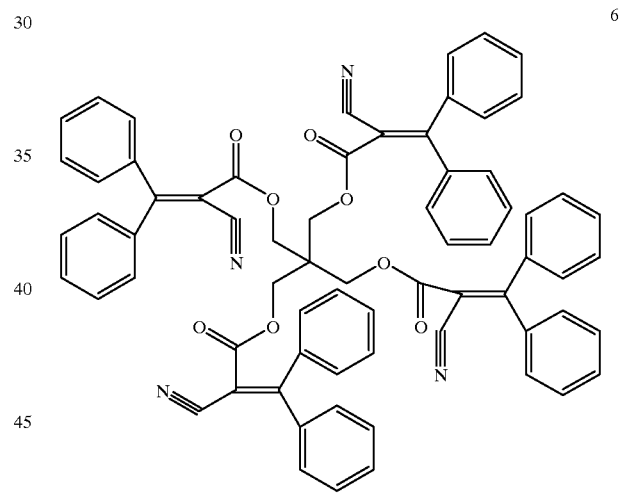

These higher molecular weight cyanoacrylic acid ester compounds are selected to provide optimized benefits and properties in the areas of UV stabilization performance, improved processability (due to reduced volatility, reduced plate-out, reduced fuming, and the like) and performance and appearance of the final articles. In general, these compounds should have molecular weights equal to or greater than about 400, preferably equal to or greater than about 500, more preferably equal to or greater than about 700 and most preferably equal to or greater than about 800 g/mol. In general, at higher molecular weights there is diminishing solubility in polycarbonate and increasing costs and molecular weights of these compounds should not be greater than about 5000, preferably not greater than about 4000, more preferably not greater than about 3500, and most preferably not greater than about 3000 g/mol.

The amounts of the UV absorbers to be included in the carbonate polymer compositions according to the present invention will vary depending upon whether they are to be employed in "standard" levels throughout the total thickness or bulk of the carbonate polymer to be stabilized or in a concentrate, capstock or surface coating type of resin where relatively high concentrations are employed in order to completely block UV transmittance to the substrate article or layers in a relatively thin layer thickness. In general, to provide UV absorption protection to the carbonate polymers, these compounds can be used in "standard" levels of at least about 0.05 weight percent based on weight of carbonate polymer into which the compound is being incorporated, preferably at least about 0.10 weight percent, more preferably at least about 0.15 weight percent and most preferably at least about 0.20 weight percent based on weight of carbonate polymer. If preparing a concentrate resin, capstock resin or other type of surface coating these compounds can be used in levels of at least about 1 weight percent, preferably at least about 1.5 weight percent, more preferably at least about 2 weight percent, even more preferably at least about 2.5 weight percent and most preferably at least about 3 weight percent based on weight of carbonate polymer. In general, at higher concentration levels there is diminishing UV protection benefit and levels of these compounds should not be greater than about 15 weight percent, preferably not greater than about 12 weight percent, more preferably not greater than about 10 weight percent and most preferably not greater than about 8 weight percent based on weight of carbonate polymer.

The carbonate polymer composition of the present invention may comprise other known stabilizers and amounts commonly used in carbonate polymer compositions of this type, for example antioxidants, light stabilizers, metal deactivators or processing stabilizers which are described, for example, in U.S. Pat. No. 5,288,778.

The types and amounts of the stabilizer(s) to be included in the carbonate polymer compositions according to the present invention will vary depending upon the desired balance of combinations of properties and cost. In general, to provide noticeable stabilizing effects and benefits, the stabilizer(s) should be used at levels of at least about 5 parts per million (ppm) based on weight of carbonate polymer into which the compound is being incorporated, preferably at least about 25 ppm, more preferably at least about 50 ppm and most preferably at least about 100 ppm. In general, at higher concentration levels there is diminishing benefit and levels of these compounds should not be greater than about 5000 ppm, preferably not greater than about 3000 ppm, and most preferably not greater than about 2000 ppm.

In addition to the UV absorbers and other stabilizers, the carbonate polymer composition according to the present invention can advantageously contain the standard types and amounts of the additive-type components frequently incorporated into carbonate polymers. These components can include ignition resistance additives, fillers (that is, glass fibers, talc, clay, etc.), pigments, dyes, mold release agents, impact modifiers, antistatic additives, and the other additives commonly employed in carbonate polymer compositions.

The resins according to the invention are also advantageously used in blend compositions with other polymer resins such as monovinylidene aromatic polymer optionally containing an impact modifier component (e.g., acrylonitrile, butadiene and styrene copolymer (ABS) or acrylonitrile, ethylene-propylene and styrene copolymer (AES)).

Preparation of the carbonate polymer compositions of this invention can be accomplished by any suitable mixing means known in the art, including rollers, kneaders, single screw or multi-screw extruders. The individual components may be dry blended and subsequently melt mixed, either directly in the extruder used to make the finished article (e.g., the extruded sheet), or pre-mixing in a separate extruder (e.g., a Banbury mixer). Dry blends of the compositions can also be directly injection molded without pre-melt mixing.

Preferably, the carbonate polymer compositions of this invention are thermoplastic. The present invention also involves the use of the carbonate polymer compositions as described above to provide the following wide range of improved processes to prepare molded, shaped or otherwise fabricated articles and improved articles having improved combinations of protection against UV radiation, color and color stability with reduced plate-out behavior during processing. Extrusion, blow molding, thermoforming and injection molding processes for carbonate polymer compositions are well known in the art and commercially practiced for production of a broad range of parts and structures. As is known, extrusion processes for preparing sheet, profiles and like structures involve the steps of melting, forcing the melted polymer through a die, calibration, if needed, and cooling. As is known, blow molding processes for preparing bottles, containers, instrument panels and like structures involve the steps of extrusion or injection molding of an expandable parison, expansion or blowing of the parison to the desired shape and cooling. As is known, thermoforming processes for preparing trays, containers, chocolate molds, and like structures involve the steps of preparing a thermoformable sheet or preform, heating the sheet or preform adjacent to the mold or form of the desired shape, applying a pressure (air pressure or a physical force) or suction to appropriately shape the sheet or preform in the mold or form and cooling. As is known, the injection molding process for lenses, headlamps, lamp covers, and like structures involves the steps of melting, forcing the melted polymer into a mold and cooling.

The improvements in resins, processes and articles and structures according to the present invention are due to the improved UV resistance, improved color and color stability and reduced tendency to plate-out and fuming that provide improved productivity versus a standard resin.

EXAMPLES

The following experiments show the benefits of carbonate polymer compositions according to the present invention in terms of UV stability, prevention of thermal loss of UV absorbers and improved base color and color stability. These Experiments are given to further illustrate the invention and should not be construed as limiting its scope.

Polycarbonate

The polycarbonate resin used in all of the experiments is CALIBRE 200-15 polycarbonate resin. This resin is a linear polycarbonate, has a $M_w$ of about 26400 (as measured by GPC) and a melt flow of 15 g/10 min. (as measured by according to ASTM D-1238 under conditions of 300° C./1.2 kg).

UV Absorbers

The following UV absorbers are used in the experiments:

Hydroxybenzotriazole—Tradename LA-31 from Adeka Argus (LA-31)

Molecular weight: 662 g/mol

Chemical name: 2,2'-methylene-bis-(6-{2H-benzotriazol-2-yl}-4-{1,1,3,3-tetramethylbutyl}-phenol)

Hydroxyphenyltriazine—Tradename TINUVIN™ 1577 from Ciba Geigy (1577)

Molecular weight: 429 g/mol
Chemical name: 2-(4,6-diphenyl-1,3,5-triazin-2-yl)-5-hexyloxyphenol
Cyanoacrylic acid ester—Tradename UVINUL™ 3030 from BASF (3030)
Molecular weight: 1060 g/mol
Chemical name: 1,3-bis-[(2'-cyano-3',3'-diphenylacryloyl)oxy]-2,2-bis-[(2-cyano-3',3'-diphenylacryloyl)oxy]methyl)propane
Benzoxazinone—Tradename CYASORB™ 3638 from Cytec Industries
Molecular weight: 368 g/mol
Chemical name: 2,2'-(1,4-phenylene)bis-[4H-3,1-benzoxazin-4-one]

Determination of Initial Base Color and Color Stability

For the purpose of such assessment, the UV absorbers are compounded in the polycarbonate feedstocks at levels between about 1500 and 45,500 ppm (0.15 and 4.55 weight percent) on a ZSK-25 twin screw co-rotating Werner and Pfleiderer extruder. The temperature profile used in the extruder is 240° C.-250° C.-260° C.-270° C.-280° C.-290° C.-300° C.-300° C.

Prior to compounding, the polycarbonate is dried at 120° C. for 4 hours. The initial base color is measured on the produced granules using a Hunterlab COLORQUEST™ Colorimeter. Granules are placed in a 50 mm by 50 mm by 50 mm quartz cuvette and color is measured in Reflection mode. Color is expressed using the Yellowness Index (YI) D1925 as well as the CIE Lab L*, a* and b* values. Each measurement is repeated at least five times and an average is calculated.

The polycarbonate granules are subsequently injection molded into color chips on an Arburg 800-325 ALL-ROUNDER™ 370 CMD injection molding machine. The color is measured on the 3.0 mm plaques using the Hunterlab COLORQUEST Colorimeter. For the transparent polycarbonate, the measurement is done using the Transmission mode. As color data, the YI as well as the CIE Lab L*, a* and b* values are recorded. Each measurement is repeated at least five times and an average is calculated.

Injection molding conditions are varied in order to assess the sensitivity of the various resins on initial color and color stability. Particularly, injection molding temperatures at the die of 320° C. and 380° C. are used, when UV absorber levels are below 1 weight percent. At higher UV absorber levels, injection molding temperatures at the die of 280° C. are used. All other molding parameters are kept constant.

An increasing temperature profile from hopper to die is used. Per zone, an increment of 10° C. is set. For instance, for a die set temperature of 380° C., a temperature profile 340-350-360-370-380° C. is used. For the sake of simplicity, only the die set temperature is mentioned in the experiments.

The barrel residence time is kept constant by adjusting the machine cycle time at 40 seconds. Taking into account the barrel volumes and part weight, this corresponds to a total barrel residence time of 5 minutes. A five-step holding pressure profile is used in each case. Per step, holding pressure is decreased by 100 bar. A typical holding pressure profile was 1200-1100-1000-900-800 bar. During molding, part weight is monitored continuously. When a deviation occurs, this is corrected by adjusting holding pressures. Corrective actions are made in steps of 100 bar over the entire holding pressure profile.

The difference between the color measured at die temperatures of 380° C. ($YI_{380° C.}$) and at 320° C. ($YI_{320° C.}$) is regarded as a measure for the thermal stability of the polycarbonate materials ($\Delta YI$).

UV-Stability Testing

Injection molded plaques, as molded in the thermal stability study (condition 320° C.), are evaluated in a QUV-B test using 313 nanometer (nm) lamps and a cycle of 4 hours of UV irradiation at 60° C. followed by 4 hours of exposure to water condensation at 50° C. (in a heated saturated mixture of air and water vapor—AS™ G 53-88).

The difference between the color for a 320° C. molded plaque before ($YI_{320° C.}$) and after 700 hours of QUV-B exposure (UV $YI_{320° C.}$) is regarded as a measure for the UV stability of the polycarbonate materials (UV $\Delta YI$).

Determination of Loss of UV Additive

Loss of UV absorber from a polymer plaque experiments are performed as follows. For the purpose of such assessment, granules of the carbonate polymer compositions containing the UV additives, prepared as discussed above, are taken and compression molded on an Akila compression molding press at a temperature of 260° C. into square plaques of 50 mm by 50 mm and having a thickness of 0.5 mm.

On these plaques, initial UV absorber contents is determined using a HPLC analysis technique. These plaques are placed in an air-circulated oven at various temperatures for various residence times. After the oven exposure, the contents of the UV absorber are measured again and compared to the initial content.

The decrease in UV absorber contents can be regarded as a measure for the degree of fuming and plate-out that can be experienced during material processing such as injection molding or (co)extrusion of sheet structures. Loss of UV absorber is reported as weight percent (wt %) loss and percentual (%) loss based on the initial weight of the UV absorber in the carbonate polymer composition.

Examples 1 to 3 and Comparative Examples A to G are prepared from polycarbonate 200-15 and various UV absorbers using the compounding conditions described hereinabove. Base color (YI), color stability ($\Delta YI$), and UV stability (UV $\Delta YI$) are evaluated according to the techniques described hereinabove. The amount of UV absorbers and performance properties are shown in Table 1, weight percent is based on the weight of the carbonate polymer composition.

Examples 4 to 6 and Comparative Examples H to J are prepared from polycarbonate 200-15 and various UV absorbers using the compounding conditions described hereinabove. Base color on pellets (YI) and on plaques molded at 280° C. ($YI_{280° C.}$) is evaluated according to the techniques described hereinabove. The amount of UV absorbers and YI and $YI_{280° C.}$ performance properties are shown in Table 2, weight percent is based on the weight of the carbonate polymer composition.

Loss of UV absorbers for Examples 4 to 6 and Comparative Examples H to J is determined over a temperature range from 240° C. to 280° C. over a period of 80 minutes and the results are presented in Tables 3 to 11.

TABLE 1

| | Example | | | Comparative | | | | | | |
|---|---|---|---|---|---|---|---|---|---|---|
| | 1 | 2 | 3 | A | B | C | D | E | F | G |
| UV Absorber, wt % | | | | | | | | | | |
| LA-31 | 0.15 | | 0.15 | 0.15 | | | 0.3 | | | |
| 1577 | 0.15 | 0.15 | | | 0.15 | | | 0.3 | | |
| 3030 | | 0.15 | 0.15 | | | 0.15 | | | 0.3 | |
| 3638 | | | | 0.15 | 0.15 | 0.15 | | | | 0.3 |
| Performance Granules | | | | | | | | | | |
| YI Plaques | 9.54 | 8.93 | 6.67 | 5.77 | 7.13 | 5.89 | 6.11 | 10.33 | 6.28 | 4.27 |
| $YI_{320°\,C.}$ | 4.36 | 3.67 | 3.74 | 2.93 | 2.95 | 2.91 | 3.70 | 4.35 | 2.89 | 2.50 |
| $YI_{380°\,C.}$ | 4.45 | 4.48 | 4.53 | 4.88 | 5.18 | 11.61 | 4.01 | 4.79 | 3.89 | 4.97 |
| ΔYI | 0.09 | 0.81 | 0.79 | 1.95 | 2.23 | 8.70 | 0.31 | 0.44 | 1.00 | 2.47 |
| After 700 hr QUV-B | | | | | | | | | | |
| UV $YI_{320°\,C.}$ | 12.93 | 12.85 | 13.39 | 13.08 | 14.47 | 13.36 | 13.84 | 13.44 | 14.02 | 13.02 |
| UV ΔYI | 8.57 | 9.18 | 9.65 | 10.15 | 11.52 | 10.45 | 10.14 | 9.09 | 11.13 | 10.52 |

TABLE 2

| Example Comparative | 4 | 5 | 6 | H | I | J |
|---|---|---|---|---|---|---|
| UV Absorber, wt % | | | | | | |
| LA-31 | 2.48 | | 2.29 | 3.94 | | |
| 1577 | 2.48 | 2.40 | | | 4.13 | |
| 3030 | | 2.37 | 2.29 | | | 4.55 |
| Performance Granules | | | | | | |
| YI Plaques | 37.65 | 36.57 | 29.90 | 27.97 | 40.94 | 27.54 |
| $YI_{280°\,C.}$ | 19.89 | 18.46 | 13.94 | 13.33 | 23.57 | 13.60 |

TABLE 3

Ex. 4: Loss of LA-31

| | Time, minutes | | | | |
|---|---|---|---|---|---|
| Temperature, ° C. | 0 | 20 | 40 | 60 | 80 |
| 240 | 2.48 | 2.31 | 2.28 | 2.18 | 2.11 |
| 260 | 2.48 | 2.24 | 2.22 | 1.91 | 1.69 |
| 280 | 2.48 | 2.12 | 1.85 | 1.83 | 1.37 |
| Loss, wt % | | | | | |
| 240 | 0 | 0.17 | 0.20 | 0.30 | 0.37 |
| 260 | 0 | 0.24 | 0.26 | 0.57 | 0.79 |
| 280 | 0 | 0.62 | 0.96 | 1.05 | 1.30 |
| Loss, % | | | | | |
| 240 | 0 | 6.9 | 8.1 | 12.1 | 14.9 |
| 260 | 0 | 9.7 | 10.5 | 23.0 | 31.9 |
| 280 | 0 | 25.0 | 38.7 | 42.3 | 52.4 |

TABLE 4

Ex. 4: Loss of 1577

| | Time, minutes | | | | |
|---|---|---|---|---|---|
| Temperature, ° C. | 0 | 20 | 40 | 60 | 80 |
| 240 | 2.48 | 2.40 | 2.36 | 2.35 | 2.28 |
| 260 | 2.48 | 2.38 | 2.35 | 2.24 | 1.82 |
| 280 | 2.48 | 2.12 | 1.85 | 1.83 | 1.37 |
| Loss, wt % | | | | | |
| 240 | 0 | 0.08 | 0.12 | 0.13 | 0.20 |
| 260 | 0 | 0.10 | 0.13 | 0.24 | 0.66 |
| 280 | 0 | 0.36 | 0.63 | 0.65 | 1.11 |
| Loss, % | | | | | |
| 240 | 0 | 3.2 | 4.8 | 5.2 | 8.1 |
| 260 | 0 | 4.0 | 5.2 | 9.7 | 26.6 |
| 280 | 0 | 14.5 | 25.4 | 26.2 | 44.8 |

TABLE 5

Ex. 5: Loss of 1577

| | Time, minutes | | | | |
|---|---|---|---|---|---|
| Temperature, ° C. | 0 | 20 | 40 | 60 | 80 |
| 240 | 2.40 | 2.39 | 2.34 | 2.32 | 2.26 |
| 260 | 2.40 | 2.25 | 2.22 | 2.06 | 2.01 |
| 280 | 2.40 | 2.16 | 1.90 | 1.88 | 1.67 |
| Loss, wt % | | | | | |
| 240 | 0 | 0.01 | 0.06 | 0.08 | 0.14 |
| 260 | 0 | 0.15 | 0.18 | 0.34 | 0.39 |
| 280 | 0 | 0.24 | 0.50 | 0.52 | 0.73 |
| Loss, % | | | | | |
| 240 | 0 | 0.4 | 2.5 | 3.3 | 5.8 |
| 260 | 0 | 6.3 | 7.5 | 14.2 | 6.3 |
| 280 | 0 | 10.0 | 20.8 | 21.7 | 30.4 |

TABLE 6

Ex. 5: Loss of 3030

| Temperature, °C | Time, minutes | | | | |
|---|---|---|---|---|---|
| | 0 | 20 | 40 | 60 | 80 |
| 240 | 2.37 | 2.28 | 2.23 | 2.20 | 2.17 |
| 260 | 2.37 | 2.27 | 2.20 | 2.18 | 2.14 |
| 280 | 2.37 | 2.21 | 2.18 | 2.14 | 2.06 |
| Loss, wt % | | | | | |
| 240 | 0 | 0.09 | 0.14 | 0.17 | 0.20 |
| 260 | 0 | 0.10 | 0.17 | 0.19 | 0.23 |
| 280 | 0 | 0.16 | 0.19 | 0.23 | 0.31 |
| Loss, % | | | | | |
| 240 | 0 | 3.8 | 5.9 | 7.2 | 8.4 |
| 260 | 0 | 4.2 | 7.2 | 8.0 | 9.7 |
| 280 | 0 | 6.8 | 8.0 | 9.7 | 13.1 |

TABLE 7

Ex. 6: Loss of LA-31

| Temperature, °C | Time, minutes | | | | |
|---|---|---|---|---|---|
| | 0 | 20 | 40 | 60 | 80 |
| 240 | 2.29 | 2.27 | 2.19 | 2.16 | 1.95 |
| 260 | 2.29 | 2.19 | 2.14 | 1.79 | 1.62 |
| 280 | 2.29 | 1.69 | 1.33 | 1.30 | 0.97 |
| Loss, wt % | | | | | |
| 240 | 0 | 0.02 | 0.10 | 0.13 | 0.34 |
| 260 | 0 | 0.10 | 0.15 | 0.50 | 0.67 |
| 280 | 0 | 0.60 | 0.96 | 0.99 | 1.32 |
| Loss, % | | | | | |
| 240 | 0 | 0.9 | 4.4 | 5.7 | 14.8 |
| 260 | 0 | 4.4 | 6.6 | 21.8 | 29.3 |
| 280 | 0 | 26.2 | 41.9 | 43.2 | 57.6 |

TABLE 8

Ex. 6: Loss of 3030

| Temperature, °C | Time, minutes | | | | |
|---|---|---|---|---|---|
| | 0 | 20 | 40 | 60 | 80 |
| 240 | 2.25 | 2.25 | 2.19 | 2.14 | 2.09 |
| 260 | 2.25 | 2.23 | 2.18 | 2.10 | 2.04 |
| 280 | 2.25 | 2.19 | 2.15 | 2.10 | 2.03 |
| Loss, wt % | | | | | |
| 240 | 0 | 0 | 0.06 | 0.11 | 0.16 |
| 260 | 0 | 0.02 | 0.07 | 0.15 | 0.21 |
| 280 | 0 | 0.06 | 0.10 | 0.15 | 0.22 |
| Loss, % | | | | | |
| 240 | 0 | 0 | 2.7 | 4.9 | 7.1 |
| 260 | 0 | 0.9 | 3.1 | 6.7 | 9.3 |
| 280 | 0 | 2.7 | 4.4 | 6.7 | 9.8 |

TABLE 9

Com. Ex. H: Loss of LA-31

| Temperature, °C | Time, minutes | | | | |
|---|---|---|---|---|---|
| | 0 | 20 | 40 | 60 | 80 |
| 240 | 3.94 | 3.48 | 3.18 | 3.10 | 2.98 |
| 260 | 3.94 | 3.10 | 2.86 | 2.20 | 1.86 |
| 280 | 3.94 | 2.38 | 1.90 | 1.35 | 1.02 |
| Loss, wt % | | | | | |
| 240 | 0 | 0.46 | 0.76 | 0.84 | 0.96 |
| 260 | 0 | 0.84 | 1.08 | 1.74 | 2.08 |
| 280 | 0 | 1.56 | 2.04 | 2.59 | 2.92 |
| Loss, % | | | | | |
| 240 | 0 | 11.7 | 19.3 | 21.3 | 24.4 |
| 260 | 0 | 21.3 | 27.4 | 44.2 | 52.8 |
| 280 | 0 | 39.6 | 51.8 | 65.7 | 74.1 |

TABLE 10

Com. Ex. I: Loss of 1577

| Temperature, °C | Time, minutes | | | | |
|---|---|---|---|---|---|
| | 0 | 20 | 40 | 60 | 80 |
| 240 | 4.13 | 3.98 | 3.73 | 3.64 | 3.59 |
| 260 | 4.13 | 3.53 | 3.32 | 3.00 | 2.76 |
| 280 | 4.13 | 3.32 | 2.96 | 2.54 | 2.46 |
| Loss, wt % | | | | | |
| 240 | 0 | 0.15 | 0.40 | 0.49 | 0.64 |
| 260 | 0 | 0.60 | 0.81 | 1.13 | 1.38 |
| 280 | 0 | 0.81 | 1.17 | 1.59 | 1.67 |
| Loss, % | | | | | |
| 240 | 0 | 3.6 | 9.7 | 11.9 | 13.1 |
| 260 | 0 | 14.5 | 19.6 | 27.4 | 33.2 |
| 280 | 0 | 19.6 | 28.3 | 38.5 | 40.4 |

TABLE 11

Com. Ex. J: Loss of 3030

| Temperature, °C | Time, minutes | | | | |
|---|---|---|---|---|---|
| | 0 | 20 | 40 | 60 | 80 |
| 240 | 4.55 | 4.51 | 4.46 | 4.34 | 4.28 |
| 260 | 4.55 | 4.33 | 4.28 | 4.23 | 4.09 |
| 280 | 4.55 | 4.28 | 4.18 | 4.04 | 3.85 |
| Loss, wt % | | | | | |
| 240 | 0 | 0.04 | 0.09 | 0.21 | 0.27 |
| 260 | 0 | 0.22 | 0.27 | 0.32 | 0.46 |
| 280 | 0 | 0.27 | 0.37 | 0.51 | 0.70 |
| Loss, % | | | | | |
| 240 | 0 | 0.9 | 1.9 | 4.5 | 6.0 |
| 260 | 0 | 4.8 | 6.0 | 7.0 | 0.2 |
| 280 | 0 | 6.0 | 8.1 | 11.3 | 15.3 |

From these data, it can be concluded that the carbonate polymer compositions of the present invention comprising one or more UV absorbing compounds having a $M_w$ greater than 400 g/mol. selected from two or more of the following groups: a hydroxybenzotriazole derivative, a hydroxyphenyltriazine derivative, or a cyanoacrylic acid ester compound yield the best balance of base color, color stability, UV stability and physical retention of UV absorber when compared with controls using a hydroxybenzotriazole derivative, a hydroxyphenyltriazine derivative, or a cyanoacrylic acid ester compound in combination with a benzoxazinone compound or using a hydroxybenzotriazole derivative, a hydroxyphenyltriazine derivative, a cyanoacrylic acid ester compound or a benzoxazinone compound individually.

It can be seen that carbonate polymer compositions, articles and fabrication techniques according to the invention provide improved combinations of resistance against UV-radiation, color and color stability, and retention of UV absorber in the resin during processing ensuring negligible levels of fuming, plate-out, mold sweat, juicing, etc. It has been found that the present invention provided improved processes for preparing, among other things, extruded sheet structures, blow molded, thermoformed, injection molded, injection blow molded, injection compression molded, film blow molded or foamed parts or structures. It can be seen that the resulting parts or structures according to the present invention are surprisingly improved by use of the described carbonate polymer compositions and the molded, shaped or otherwise fabricated articles will have improved combinations of physical and appearance properties including particularly improved UV resistance, color, color stability, cracking resistance and surface properties, without giving problems of thermal loss of the UV absorbers, resulting in problems of plate-out, fuming, mold sweat and juicing, which all reduce the production rate in commercial applications.

What is claimed is:

1. A carbonate polymer composition comprising:
   (a) a carbonate polymer dan
   (b) two or more UV absorbing compounds selected from two or more of the following groups:
      (i) a hydroxybenzotriazole derivative,
      (ii) a hydroxyphenyltriazine derivative or
      (iii) a cyanoacrylic acid ester compound
   wherein all UV absorbing compounds (i), (ii) and (iii) have a molecular weight of at least 400 g/mol.

2. A carbonate polymer composition according to claim 1 wherein the amounts of the UV absorbing compounds which may be the same or different, are from about 0.05 to about 15 weight percent.

3. The carbonate polymer composition of claim 1 wherein (b)(i) the hydroxybenzotriazole derivative is represented by formula 1

1

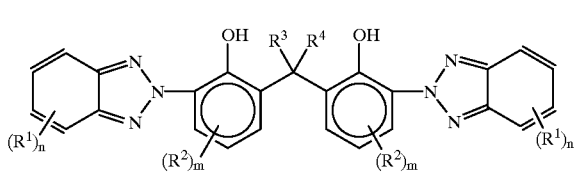

wherein $R^1$ and $R^2$, which may be the same or different, represent H, halogen, $C_1$–$C_{10}$ alkyl, $C_5$–$C_{10}$ cycloalkyl, $C_7$–$C_{13}$ aralkyl, $C_6$–$C_{14}$ aryl, $OR^5$ or $COOR^5$, wherein $R^5$ represents H or $C_1$–$C_4$ alkyl $R^3$ and $R^4$ may also be the same or different and represent H, $C_1$–$C_4$ alkyl, $C_5$ or $C_6$ cycloalkyl, benzyl or $C_6$–$C_{14}$ aryl; m represents 1, 2 or 3 and n represents 1, 2, 3, or 4.

4. The carbonate polymer composition of claim 1 wherein (b)(ii) the hydroxyphenyltriazine derivative is represented by formula 3

3

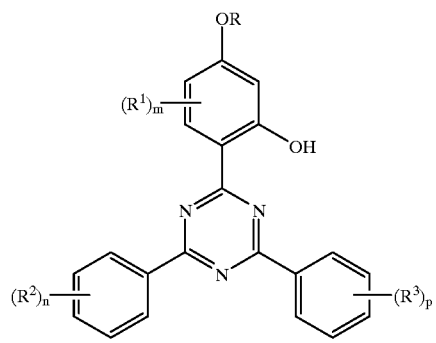

wherein R is hydrogen, $C_{10}$ to $C_{18}$ alkyl, $C_2$ to $C_6$ alkyl substituted by halogen or by $C_1$ to $C_{12}$ alkoxy, or is benzyl and $R^1$, $R^2$, and $R^3$ which may be the same or different, represent H, halogen, $C_1$–$C_{10}$ alkyl, $C_5$–$C_{10}$ cycloalkyl, $C_7$–$C_{13}$ aralkyl, $C_6$–$C_{14}$ aryl, $OR^4$ or $COOR^4$, wherein $R^4$ represents H or $C_1$–$C_4$ alkyl; and m represents 1, 2 or 3 and n and p represent 1, 2, 3, 4 or 5.

5. The carbonate polymer composition of claim 1 wherein (b)(iii) the cyanoacrylic acid ester compound is represented by formula 5

5

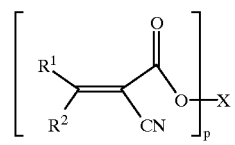

where the $R_1$ and $R_2$ substituents are each hydrogen or a radical having an iso- or heterocyclic ring system with at least one iso- or heteroaromatic nucleus, and at least one of the radicals $R_1$ or $R_2$ must be different from hydrogen; p has an average value of at least 3; X is the radical of an aliphatic or cycloaliphatic polyol having from about 3 to about 20 carbon atoms and at least p hydroxyl groups, a cycloaliphatic radical optionally containing 1 or 2 hetero atoms, and an aliphatic radical optionally being interrupted by up to 8 non-adjacent oxygen atoms, sulfur atoms, imino or $C_1$–$C_4$-alkylimino groups.

6. A carbonate polymer composition comprising:
   (a) a carbonate polymer and
   (b) at least two UV absorbing compounds selected from:
      (i) 2,2'-methylene-bis-(6-{2H-benzotriazol-2-yl}-4-{1,1,3,3-tetramethylbutyl}-phenol),
      (ii) 2-(4,6-diphenyl-1,3,5-triazin-2-yl)-5-hexyloxyphenol, or
      (iii) 1,3-bis-[(2'-cyano-3',3'-diphenylacryloyl)oxy]-2,2-bis-[(2-cyano-3',3'-diphenylacryloyl)oxy]methyl) propane.

7. A process for preparing a carbonate polymer composition which comprises the step of combining:
   (a) a carbonate polymer and
   (b) two or more UV absorbing compounds selected from two or more of the following groups:
      (i) a hydroxybenzotriazole derivative,
      (ii) a hydroxyphenyltriazine derivative, or
      (iii) a cyanoacrylic acid ester compound
   wherein all UV absorbing compounds (i), (ii) and (iii) have a molecular weight of at least 400 g/mol.

8. A process for producing an extruded or molded article of a carbonate polymer composition comprising the steps of:

(A) preparing a carbonate polymer composition which comprises the step of combining:
  (a) a carbonate polymer and
  (b) two or more UV absorbing compounds selected from two or more of the following groups:
    (i) a hydroxybenzotriazole derivative,
    (ii) a hydroxyphenyltriazine derivative, or
    (iii) a cyanoacrylic acid ester compound wherein all UV absorbing compounds (i), (ii) and (iii) have a molecular weight of at least 400 g/mol, and
  (B) extruding or molding the carbonate polymer composition into an extruded or molded article.

9. The composition of claim 1 in the form of a molded or extruded article.

* * * * *